US007269641B2

United States Patent
Powers et al.

(10) Patent No.: US 7,269,641 B2
(45) Date of Patent: Sep. 11, 2007

(54) REMOTE RECONFIGURATION SYSTEM

(75) Inventors: Tracy D. Powers, Thornton, CO (US); Madeleine M. Slattery, Ft. Lauderdale, FL (US); Linda D. Edwards, Cedartown, GA (US); Anthony J. Mullen, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 1137 days.

(21) Appl. No.: 09/919,192

(22) Filed: Jul. 31, 2001

(65) Prior Publication Data
US 2002/0026549 A1 Feb. 28, 2002

Related U.S. Application Data

(60) Provisional application No. 60/229,153, filed on Aug. 30, 2000.

(51) Int. Cl.
*G06F 15/177* (2006.01)
*G06F 15/173* (2006.01)

(52) U.S. Cl. ............... 709/221; 709/220; 709/223; 709/224

(58) Field of Classification Search ........... 709/220, 709/224, 221, 223; 711/114; 370/420; 710/200; 395/182
See application file for complete search history.

(56) References Cited

U.S. PATENT DOCUMENTS

| | | | | |
|---|---|---|---|---|
| 5,151,895 A * | 9/1992 | Vacon et al. | ............ | 370/420 |
| 5,327,560 A | 7/1994 | Hirata et al. | ............ | 395/700 |
| 5,574,851 A | 11/1996 | Rathunde | ............ | 395/182.05 |
| 5,678,006 A * | 10/1997 | Valizadeh et al. | ........... | 709/223 |
| 5,784,702 A * | 7/1998 | Greenstein et al. | ......... | 711/173 |
| 5,822,531 A | 10/1998 | Gorezyca et al. | ........ | 395/200.51 |
| 5,854,942 A * | 12/1998 | Penokie | ............ | 710/10 |
| 5,862,333 A * | 1/1999 | Graf | ............ | 709/223 |
| 5,890,204 A * | 3/1999 | Ofer et al. | ............ | 711/111 |
| 6,009,466 A * | 12/1999 | Axberg et al. | ............ | 709/220 |
| 6,032,217 A | 2/2000 | Arnott | ............ | 710/200 |
| 6,058,489 A | 5/2000 | Schultz | ............ | 714/7 |
| 6,085,244 A * | 7/2000 | Wookey | ............ | 709/224 |
| 6,145,067 A * | 11/2000 | Kuwata | ............ | 711/165 |
| 6,209,059 B1 * | 3/2001 | Ofer et al. | ............ | 711/114 |
| 6,385,668 B1 * | 5/2002 | Gaddess et al. | ............ | 710/8 |
| 6,430,611 B1 | 8/2002 | Kita et al. | ............ | 709/223 |
| 6,480,901 B1 * | 11/2002 | Weber et al. | ............ | 709/246 |
| 6,538,669 B1 * | 3/2003 | Lagueux et al. | ............ | 715/764 |
| 6,584,499 B1 * | 6/2003 | Jantz et al. | ............ | 709/220 |
| 6,886,020 B1 * | 4/2005 | Zahavi et al. | ............ | 707/204 |
| 6,944,654 B1 * | 9/2005 | Murphy et al. | ............ | 709/223 |

* cited by examiner

*Primary Examiner*—Bunjob Jaroenchonwanit
*Assistant Examiner*—Ramsey Refai
(74) *Attorney, Agent, or Firm*—Michael C. Martensen; William J. Kubida; Hogan & Hartson LLP

(57) ABSTRACT

A reconfiguration system, and associated methods, for remotely reconfiguring a client's date storage system. The system includes a storage management host communicatively linked with a reconfiguration center. The storage management host is installed at a customer's site within a data storage system, which includes at least one data storage subsystem in a first configuration with a one or more master data storage units and hosts. The storage management host may be a terminal server that provides both Ethernet access to a local area network connected to the master storage units and serial communication with the master storage units. The reconfiguration center receives a reconfiguration request for the client data storage system and creates and transmits a logical implementation of a second configuration. The client data storage system operates to process the logical implementation to configure the data storage subsystem in the second configuration.

13 Claims, 3 Drawing Sheets

REMOTE RECONFIGURATION SYSTEM

CROSS-REFERENCE TO RELATED APPLICATIONS

This application claims the benefit of U.S. Provisional Application No. 60/229,153, filed Aug. 30, 2000.

BACKGROUND OF THE INVENTION

1. Field of the Invention.

The present invention relates, in general, to remote data storage management, and, more particularly, to a reconfiguration system and method for remotely manipulating and reconfiguring one or more data storage devices to modify data storage availability, expandability, and performance.

2. Relevant Background.

With the growing use of distributed or networked computing, enterprises continually battle the problems associated with storing and sharing information. To control costs and safeguard vital enterprise information, enterprises are moving toward centralized data storage or shared storage, which provides the enterprise with the ability to house data for various disparate hosts within one central storage platform. The central storage devices vary significantly and may include mass storage systems including file servers, disk and tape drives, and redundant arrays of inexpensive disks (RAID) devices. These devices are often scalable to provide more data storage capacity (with or without hardware modifications) and are typically reconfigurable to provide different performance. For example, RAID disk arrays or servers can currently be configured to operate at one of seven levels to control the way data is distributed in available memory and the way redundant capacity is implemented.

Unfortunately, after initial configuration of a data storage system and associated network, changes are often needed to improve performance. The demand for information and information access is exploding, and enterprises typically have rapidly changing data sharing environments due to larger applications, intranets, internet access, and large data transfers. Ideally, frequent reconfigurations would be performed to modify the data storage system to better fit the existing needs of the enterprise, but most enterprises have limited themselves to periodic reconfiguration with many enterprises averaging about one reconfiguration per month.

There are several reasons enterprises have limited the number of reconfigurations performed on their data storage systems. The reconfiguration process generally requires an enterprise to determine with its own personnel that reconfiguration is necessary or would be useful, to then contact one or more companies to arrange for an onsite inspection of the data storage system, and then to schedule a time for reconfiguration. This initial request and scheduling period may take days or weeks. In addition to these burdens on the enterprise, existing reconfiguration processes can be expensive (e.g., ranging from $2500 to $5000 or more per reconfiguration excluding any added hardware) in part because the enterprise has to pay for site trips by reconfiguration company personnel. The enterprise cost and inconvenience is increased by the need to take the system out of service or offline while the reconfiguration is being performed. Further, the enterprise often has to provide support personnel to assist or at least monitor the reconfiguration company personnel during their onsite work.

Hence, there remains a need for an improved method and system for reconfiguring enterprise (i.e., client) data storage systems that better meets the client's needs for periodic reconfigurations to optimize their information storage and sharing capabilities (e.g., meets their goals of data storage performance, availability, and expandability). Preferably, such a reconfiguring method and system would be more cost effective than the existing reconfiguring processes and more timely in implementation while being less disruptive of the client's business (e.g., require less system downtime).

SUMMARY OF THE INVENTION

The present invention addresses the above discussed and additional problems by providing a reconfiguration system for remotely configuring client data storage systems. In general, the reconfiguration system includes a reconfiguration center linked (such as with a T1 line for PPP communication) with a storage management host (such as a terminal server adapted for remote Ethernet and serial access) that is installed within a client data storage system. The reconfiguration center routes reconfiguration implementations from solutions centers, which create logical implementations of new configurations in response to customer reconfiguration requests, to the storage management host to remotely reconfigure master storage units in the client data storage system.

In this manner, the reconfiguration system provides remote storage management and enables prompt and non-intrusive response to data storage customers to improve their systems performance, availability, and expandability with little system downtime. Each reconfiguration may include RAID changes, capacity additions, device moves, logical unit number (LUN) size changes, CKD device changes, performance increases, channel increases, and other configuration modifications that suit the particular customer's data sharing and storing goals and needs.

More particularly, the present invention provides a remote reconfiguration system including a storage management host and a remotely located reconfiguration center communicatively linked to the storage management host. The storage management host is installed at a customer's site within a client data storage system, which includes at least one data storage subsystem in a first configuration with one or more master storage units and hosts (e.g., disk arrays, file servers, and the like with linked host devices). The storage management host is preferably a terminal server or similar device that provides both Ethernet access to a local area network (LAN) connected to the master storage units and hosts and serial communication with the master storage units. The reconfiguration center is adapted for receiving a reconfiguration request for the client data storage system and in response, for creating and transmitting a logical implementation of a second configuration. The client data storage system operates to process the logical implementation to configure the data storage subsystem in the second configuration.

According to another aspect of the invention, a method is provided for remotely reconfiguring a data storage system. The method includes installing a storage management host in a client's data storage system and then communicatively linking the storage management host with a remotely located reconfiguration system and with master storage units in the data storage system. A logical implementation of the data storage system is transferred from the reconfiguration system to the storage management host. Remote reconfiguration is achieved by executing the logical implementation to reconfigure the master storage units from a first to a second configuration.

According to yet another aspect of the invention, a method is taught for providing reconfiguration services. The method includes receiving a customer request for reconfiguration services for a data storage system and then determining if the customer is an existing or new client. If the request is from an existing client, the customer request is routed to an appropriate remote reconfiguration center for processing and collecting client information (such as existing configuration and a contract number). The method continues with determining whether a valid contract exists by searching a contract database and if so, performing the reconfiguration services remotely from the reconfiguration center. If no contract exists, a contract is established and the contract database updated or a one-time charge is established prior to performing the remote reconfiguration.

DETAILED DESCRIPTION OF THE PREFERRED EMBODIMENTS

Figure 1:
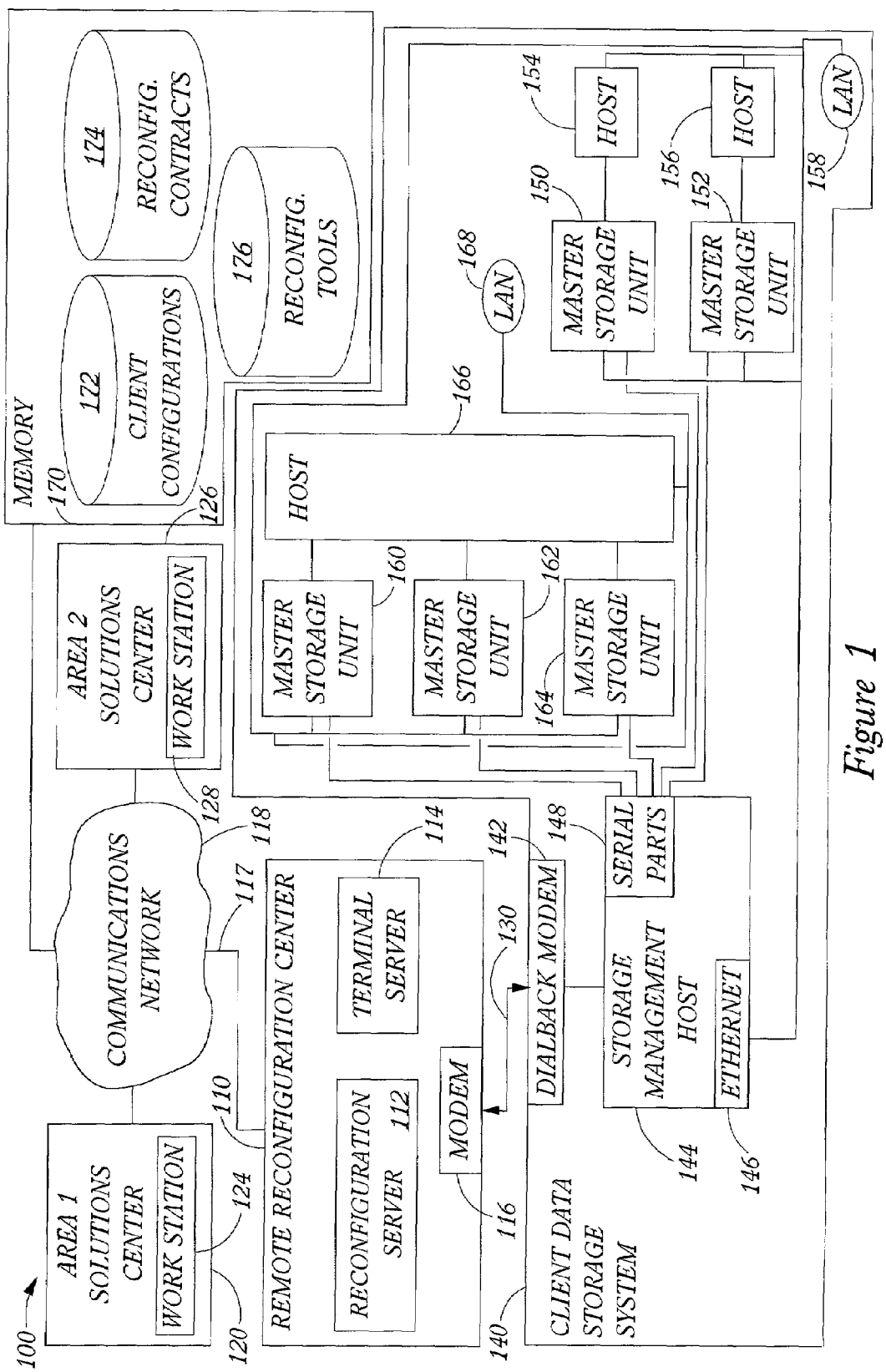
FIG. 1 illustrates a remote configuration system according to the present invention in a distributed computing environment.

The present invention provides a reconfiguration system 100 shown in FIG. 1 that is useful for remotely determining a configuration of a client data storage system, for receiving (or recommending) reconfiguration requests, and for remotely creating, implementing, and verifying a logical implementation of a new configuration (i.e., a reconfiguration) for the data storage system. Each client's environment may be reconfigured to change RAID, to add capacity (e.g., disks), to move devices within a network, to change Logical Unit Number (LUN) size, to modify performance, or to otherwise alter the existing configuration of the data storage system.

In this description, the terms configuration and reconfiguration are intended to fully encompass all hardware and software arrangements that define the data storage or other computer system and particularly the adding, deleting, and modifying of data storage (including modifying connections, addresses, and topologies) in the system to optimize data storage and sharing within the client's system and connected networks. The reconfiguration system 100 is configured to provide connectivity between service provider networks and devices and client systems and networks, which enhances remote implementation of reconfiguration implementations. The operation of the reconfiguration system 100 will be discussed to emphasize both the method of remotely creating and implementing a reconfiguration of a data storage system and the business method of providing and operating a remote reconfiguration service.

FIG. 1 illustrates one embodiment of a reconfiguration system 100 useful for remotely reconfiguring a client data storage system 140. The functions and operation of the reconfiguration system 100 are described in a client/server, de-centralized computer network environment. While this is a highly useful implementation of the invention, those skilled in the computer and networking arts will readily appreciate the features and functions of the reconfiguration system 100 are transferable to many data communication systems (other than the exemplary one illustrated) that utilize numerous and varied data transfer techniques. These variations to the exemplary reconfiguration system 100 are considered within the breadth of the following disclosure and claims.

As illustrated, the reconfiguration system 100 includes a remote reconfiguration center 110 with a reconfiguration server 112, a terminal server 114 (such as an Annex Terminal Server from Xylogics), and a modem 116 in communication via data communication link 117 and communications network 118 with an Area 1 solutions center 120 and an Area 2 solutions center 126. In operation, the remote reconfiguration center 110 typically monitors client systems and receives reconfiguration requests and forwards the requests (with or without processing) to the appropriate solutions center 120, 126 (or the requests may be direct to the solutions centers 120, 126 from the clients). The reconfiguration server 112 may be nearly any computer device and may include a personal computer or workstation for facilitating data entry and viewing data by an operator. The solutions centers 120, 126 typically operate to support certain geographic regions and/or client networks.

Figure 2:
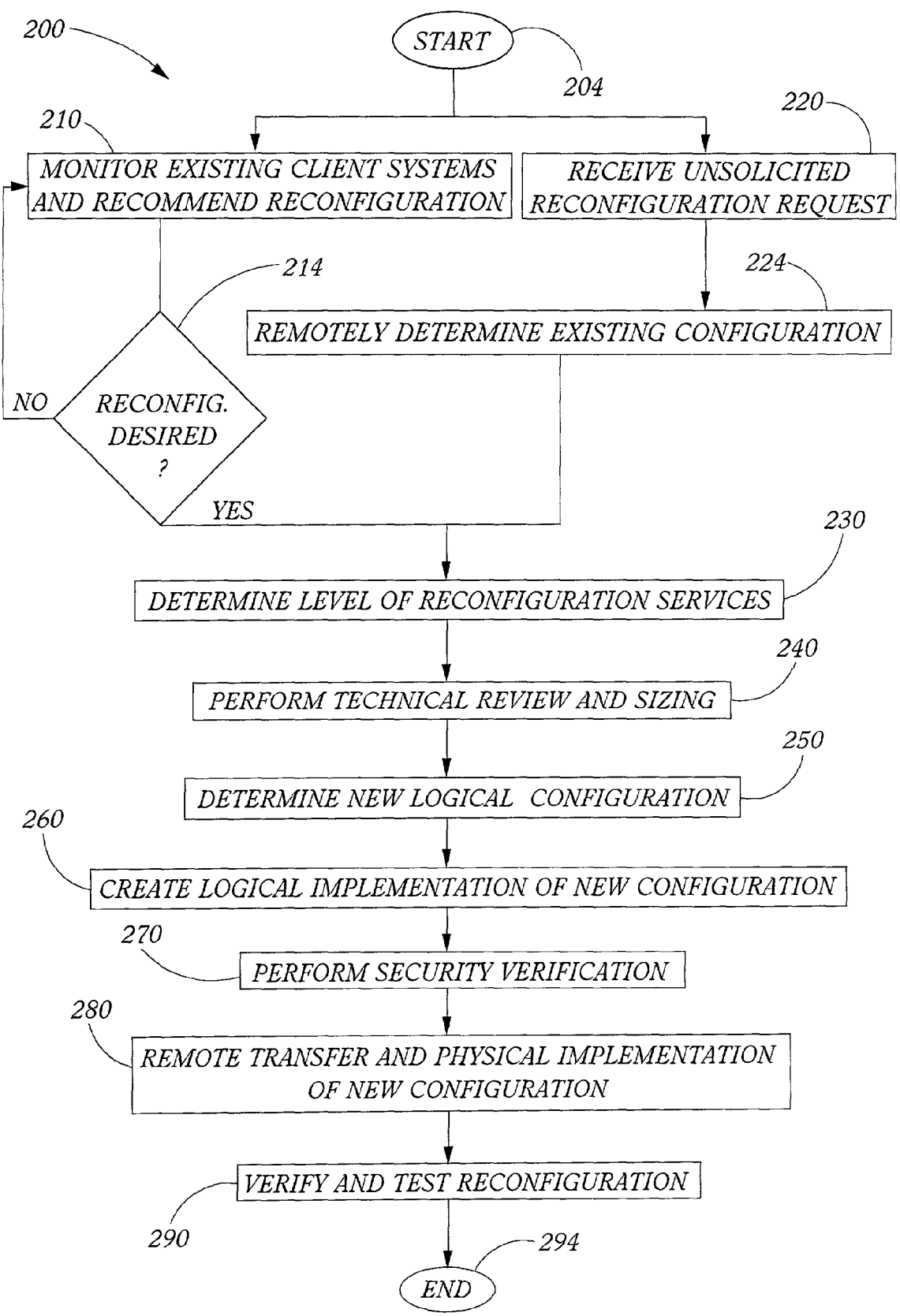
FIG. 2 is a flow diagram showing the operation of the remote reconfiguration system of FIG. 1 illustrating exemplary functions that facilitate effective remote configuration of a client data storage system.
Figure 3:
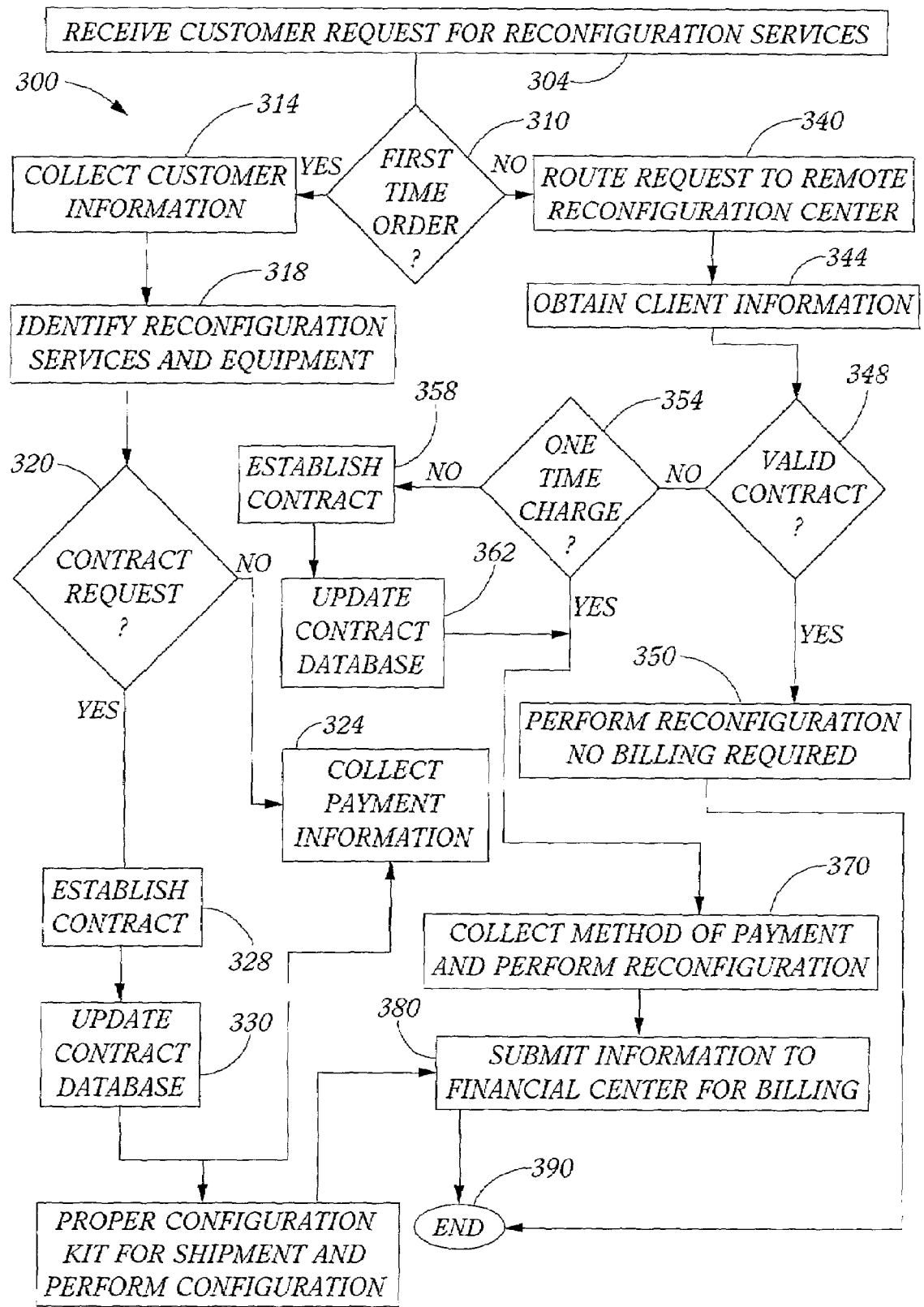
FIG. 3 is a flow diagram showing reconfiguration business processing according to the present invention.

The solutions centers 120, 126 include workstations 124, 128 (e.g., personal computers and the like) and are operated to process reconfiguration requests to create, implement, and verify reconfiguration implementations (as discussed more fully with reference to FIGS. 2 and 3). Note, that the reconfiguration center 110 and the solutions centers 120, 126 may be combined and located at a single geographic location to provide the functions of the present invention. The solutions centers 120, 126 are linked via communications network 118 (a LAN, WAN, the Internet, or other digital data communications network) to memory 170, which may be located at any location in the system 100. The memory 170 (e.g., a file server and the like) is shown to include client configuration files 172 for storing configuration information gathered by the remote reconfiguration center 110, reconfiguration contract files 174 for storing information on which clients have reconfiguration contracts and the types of such contracts (as will be discussed in detail with reference to FIG. 3), and reconfiguration tools 176 that are useful for automatically or manually creating logical implementations for new configurations (such as storage architecture worksheets, component management software, and script or routine writers).

Throughout this description, network and computer devices, such as solutions centers 120, 126, memory 170, reconfiguration and terminal servers 112, 114, are described in relation to their function rather than as particular electronic devices and computer architectures. To practice the invention, the computer devices and network devices may be any devices useful for providing the described functions, including well-known data processing and communication devices and systems such as personal computers with processing, memory, and input/output components. Many of the network devices may be server devices configured to maintain and then distribute software applications over a data communications network. The communication links, such as link 117, may be any suitable data communication link, wired or wireless, for transferring digital data between two electronic devices (e.g., a LAN, a WAN, an Intranet, the Internet, and the like). In a preferred embodiment, data is communicated in digital format following standard protocols, such as TCP/IP, but this is not a limitation of the invention as data may even be transferred on storage mediums between the devices or in print out form for later manual or electronic entry on a particular device.

The remote configuration center 110 is communicatively linked via modem 116 (or other I/O device) and communications link 130 with a client data storage system 140. The client data storage system 140 is an exemplary and simplified data storage and sharing network that may exist at a client or customer's site. The communications link 130 may be any suitable connection, such as a PPP phoneline connection (56K or higher), a T1 or T3 line (ISDN), frame relay, and the like. A dialback modem 142 is provided to achieve the secure connection feature of the invention as described with reference to FIG. 2 (such as a Dialback Modem, Part. No. 2806-00 from 3COM USRobotics) but other non-dialback modems may be used if the security feature is not implemented as described.

According to an important feature of the invention, a storage management host 144 is included in the client data storage system 140 to provide connectivity between the remote configuration center 110 and components of the storage system 140 and to enable remote reconfiguration. In one embodiment, the storage management host 144 is a terminal server (e.g., a terminal server available from Xylogics, such as an Annex Terminal Server, Part. No. X2065A). Preferably, the storage management host 144 is configured with linking and access software (not shown) that facilitates remote access by the remote configuration center 110, such as software that enables a remote user to use a graphical user interface (GUI) to click and point on their monitor to remotely connect to devices linked to the storage management host 144 and/or to LANs linked to the host 144. Further, the host 144 is preferably adapted for remote configuration and management by the remote reconfiguration center 110 and/or the solutions centers 120, 126, such as by using Telnet or an SNMP-based management system. In this fashion, the storage management tool 144 can be used as a remote configuration tool.

The storage management host 144 is preferably configured to provide connectivity to other components of the data storage system 140 to allow remote management and monitoring of the configuration of these components. In this regard, the storage management host 144 includes an Ethernet connection 146 for connection with LANs 158, 168 in the storage system 140 and to other components. The storage management host 144 further includes serial ports 148 for serial connection with the storage devices in the storage system 140 to allow monitoring and configuration of these devices via the storage management host 144.

As illustrated in the exemplary (but not limiting) client data storage system 140, data sharing is achieved with two separate subsystems each having a number of hosts (e.g., open system hosts, mainframe hosts, and the like), storage devices, and connection with a network to providing sharing of data to other client network devices (not shown). One subsystem comprises a single host device 166 connected to and managing access to three master storage units 160, 162, and 164. The host 166 controls access by other network devices (not shown) that communicate with the host 166 via the LAN 168. A slightly different hardware arrangement is used in the second subsystem which comprises a pair of host devices 154, 156 controlling access to and management of a pair of master storage units 150 and 152, respectively. Access to the master storage units 150, 152 is provided via LAN 158, which is linked with the hosts 154, 156.

As discussed previously, data sharing needs are frequently changing which leads to the use of master storage units 150, 152, 160, 162, 164 that are preferably remotely scalable in capacity and configurable (such as by modification of storage software architecture and data share software in the units) to meet data needs of a changing client environment. In one embodiment, one or more of the master storage units 150, 152, 160, 162, and 164 are intelligent cache-based disk systems having a plurality of RAID levels, such as the Sun™ A7000 storage server. In another embodiment, one or more of the master storage units 150, 152, 160, 162, and 164 are differing types of storage arrays with configurable storage and multiple levels of RAID, such as disk arrays including, but not limited to, disk arrays available from Sun Microsystems, Inc. as Model No. T3. Of course, numerous other types of data storage devices may be utilized within the client data storage system 140 to still practice the invention as long as such devices provide connectivity to the storage management host 144 and are adapted for remote management and configuration (as described below in detail).

With this basic understanding of the components of the reconfiguration system 100, the operation of the reconfiguration system 100 is described with reference to FIGS. 2 and 3. First, the process of remotely reconfiguring 200 is discussed highlighting the important features of the system 100 that enable effective, remote reconfiguring. Second, the operation of the reconfiguring system 100 is discussed that provides a unique method of providing reconfiguring services remotely to networked clients.

The remote reconfiguration process 200 begins at 204 and is a collection of storage management functions that together combine to address the changing environment of a client by providing ongoing or periodic reconfiguration to optimize or enhance operation of the client data storage system 140. At 210, the reconfiguration process 200 operates on an ongoing and preemptive fashion to monitor on a continuous or at least periodic manner the existing configuration of the storage system 140. Typically, this is achieved by a monitoring routine implemented in the reconfiguration server 112 for ongoing and/or remote monitoring by an operator of the workstation 124, 128 at a solutions center 120, 126. As part of this monitoring function 210, trend analysis and reporting for the storage system 140 are performed and if determined (automatically or manually by an operator) appropriate based on the analysis results, a reconfiguration recommendation is transmitted to the client data storage system 140 (or otherwise brought to the attention of an operator of the system 140). At 214, a response to the recommendation is received from the storage system 140. If no reconfiguration is desired, monitoring at 210 is resumed. If reconfiguration is approved at 214, the reconfiguration process 200 continues at 230 with the determination of the level of reconfiguration services requested or previously assigned.

In addition to preemptive reconfiguration recommendations, the reconfiguration process 200 includes at 220 receiving unsolicited reconfiguration requests. Typically, these reconfiguration requests are transmitted via the link 130 from the client data storage system 140 to the remote reconfiguration center 110 (although the requests may be transmitted electronically, wirelessly or otherwise, such as in a telephone call, to a solutions center 120, 126). At 224, the existing configuration of the storage system 140 (of the requesting client) is determined. In one embodiment, this determination includes determining if the client is an existing client and if so, retrieving the client configuration from previously stored configurations 172 in memory 170. If the requesting party is not a client or if the information is not in memory 170, the existing configuration determination may be performed remotely by the remote reconfiguration center 110 contacting the storage management host 144. Alternatively, the configuration determination is performed by an operator of the storage system 140 completing paper worksheets or electronic worksheets/forms (such as worksheets accessible from a reconfiguration web page maintained by the reconfiguration server 112 or the solutions centers 120, 126) and transmitting these completed forms to the remote reconfiguration center via modems 142, 116, and link 130 and then to solutions centers 120, 126 and storage in client configuration files 172. With this existing configuration information collected, the reconfiguration process 200 can continue at 240 with a technical review and sizing or optionally, to facilitate billing and determination of a new configuration, a determination of the level of service to be provided can be made. Of course, the configuration determination includes identifying the types of storage devices utilized for the master storage units in system 140, which affects which types of reconfiguration steps and services are appropriate and should be considered as part of the process 200.

Because each operator of a data storage system 140 may have different data sharing needs, varying business goals, and financial capacity, the reconfiguring process 200 may include at 240 the function of identifying a level of service requested (e.g., contracted for by the system 140 operator). For example, the reconfiguring services provided in process 200 by the reconfiguration system 100 can be grouped into a number of levels of services to meet different operator needs and storage systems 140 designs. Typically, the service levels provided in the reconfiguration process will range from a lower cost option (e.g., Option 1) that may be limited in scope and/or quantity of reconfigurations per time period to more costly options (e.g., Options 2 and 3) that provide more frequent reconfiguration and/or a larger scope of services and effort.

In one embodiment, three levels of service (i.e., Options 1, 2, and 3) are provided by the reconfiguration system 100. Option 1 is the more basic service and may include for example (and if applicable to the master storage units used in the system 140): one reconfiguration per time period (e.g., one year); a logical unit number (LUN) size change which may include re-partitioning master storage units to optimize system management; cache blocking (e.g., segmenting cache in master storage units more efficiently for applications being run by the operator of the storage system 140); establishing hot standby (e.g., isolating a disk device such as a master storage unit for allocating in case of failure); changing RAID (e.g., swapping RAID levels to allow for different levels of data protection in master storage units); and moving a device (e.g., re-mapping master storage units between subsystems of the storage system 140 or within a single subsystem to optimize and/or increase storage space).

Option 2 is an expanded service that may include all the services of Option 1 and add other services such as mainframe device type changing (e.g., adjusting the settings of the storage device to meet the changing needs and growth of a client's data storage system 140 and the devices connected to the system 140) and adding channels (e.g., adding physical connections between a host and a master storage unit to increase performance and efficiency of data transfer). Option 3 (in this embodiment) is the most costly and extensive service level and may build on Option 1 and/or 2 and further include ongoing monitoring (as discussed with reference to step 210) and increasing performance (e.g., balancing the transfer of data through the channels to increase efficiency across the subsystems of the storage system 140 such as between the devices managed by host 166 and the hosts 154, 156). Of course, numerous other option levels may be useful within the invention and may include a wide variety of services that would be useful as part of reconfiguring data storage system 140. By first determining the level of service requested or expected by a client, the reconfiguring process 200 is made more effective and efficient (e.g., recommended configurations are fitted to the expectations of the client).

At 240, technical review and sizing is performed based on the existing configuration, the level of service identified at 230, and any additional information provided in the reconfiguration request at 210 or 220. This function of the process 200 preferably involves the determination of the configurability of the components of the data storage system 140 (plus any add on components) and a verification of the correctness of the information collected so far in the process 200 (e.g., is the existing configuration accurate/feasible, are requested components compatible, are components recommended by technical sales representatives correct for the data storage system, and the like). In one embodiment, some or all of the technical review and sizing is performed automatically with software at the solutions center 120, 126. In another embodiment, this function is performed by one or more operators of the solutions centers 120, 126.

For example, a cross-discipline team may be formed at each solutions center 120, 126 to perform the technical review and sizing. Their functions may include analyzing the reconfiguration request with regard to I/O protocol, the business needs of the client, and the interaction of the components of the storage system 140. The team at 240 may also verify that a planned reconfiguration is maintainable and supportable and select appropriate reconfiguration tools 176 stored in memory 170 or elsewhere that would be useful in completing the reconfiguration. The reconfiguration request is also broken down into component level information (which may be obtained, in part, from the client configuration files 172 or a separate configuration management database (not shown)). If components are being added into the storage system 140, the team at 240 determines if the new components being requested will fit into the existing configuration and determine a location in the system 140 for physical installation.

At 250, the reconfiguration process 200 continues with the design and selection of a new configuration of the data storage system 140. Again, this step may be performed automatically with software on the workstations 124, 128 at the solutions centers 120, 126 such as architecting worksheets and the like that are useful for creating a logical configuration. The new configuration may also be performed by the team discussed in step 240 with or without assistance from software programs or other tools (such as sets of interconnected worksheets). As input, step 250 uses the reviewed and corrected information from step 240. The design of a new physical configuration at 250 functions to integrate any new components and requested modifications with the existing configuration of the storage system 140.

At 260, a logical implementation of the new configuration is constructed (again automatically, semi-automatically, or manually by team members). In a preferred embodiment, reconfiguration tools 176 stored in memory 170 are utilized to create a logical implementation of what is needed to physically implement the new configuration. Numerous tools may be used in this regard and may include component manager routines, data storage system configuration worksheets, script or routine writing programs, and the like.

Reconfiguration 200 continues at 270 with the performance of a security verification to obtain a secure communication connection between the remote reconfiguration center 110 and the client data storage system 140. In one embodiment, a secure connection or security verification is achieved by the reconfiguration server 112 or terminal server 114 initiating a call or connection from the modem 116 to the dialback modem 142 at the data storage system 140. The dialback modem 142 is configured to prompt the server 112, 114 at the remote reconfiguration center 110 for a password (or to otherwise verify the identity of the call initiator). If an operator enters the proper password (e.g., a password selected at the installation of the dialback modem 142), the dialback modem 142 operates to break the connection on line 130 or hang up and then initiate a call over line 130 to the modem 116 of the remote reconfiguration center 110 to establish a connection (such as a PPP connection). Of course, the secure connection can also be established with a particular solutions center 120, 126 rather than with the center 110.

With the secure connection made, the reconfiguration process 200 can continue at 280. In one embodiment, the reconfiguration server 112 or terminal server 114 is adapted to script every keystroke and response during the reconfiguration process 200 while the connection is maintained. If desirable, inactivity timers can be configured in the terminal server 114 such that the connection is dropped after a certain amount of time passes without activity (e.g., without data transfer).

At 280, the completed logical configuration (e.g., reconfiguration) is uploaded to client data storage system 140 via the storage management host 144. The executables provided with the transferred logical configuration are run within the system 140 to incorporate the modifications to the master storage units 150, 152, 160, 162, 164 called for in the logical implementation and achieve reconfiguration remotely from the solutions centers 120, 126. At 290, verification and testing steps are performed remotely from the solutions centers 120, 126 and/or locally at the physical location of the data storage system 140 to ensure that the reconfiguration executable commands were run successfully in step 280. Real time support can be provided from the solutions centers 120, 126 to an operator of the data storage system 140 by online communications and/or telephone conferences.

Once verified and tested, the remote reconfiguration process 200 is ended at 294. With the reconfiguration process 200, site visits are not required or are reduced in quantity and duration, system downtime is limited (only offline while actual reconfiguration is occurring in step 280 and/or in 290), and turnaround can be short (e.g., in some cases, within hours from the time a reconfiguration request is submitted until reconfiguration is completed).

Referring now to FIG. 3, a method 300 of providing remote configuration services with the reconfiguration system 100 is illustrated. At 304, a request is received from a customer for reconfiguration services (such as the services discussed with reference to FIG. 2). At 310, it is determined whether the customer is making a first time order or is a previously established client (e.g., with equipment useful for remote reconfiguration already installed such as the storage management host 144 and the dialback modem 142).

If a first time order, the method 300 continues at 314 with the collection of customer information, such as the components of their data storage system 140 and their current configuration. At 318, appropriate reconfiguration services for the customer and needed equipment for allowing remote reconfiguration and/or for modifying the data storage system 140 (e.g., add-on equipment) are identified. At 320, the customer is prompted to indicate whether they desire a reconfiguration services contract or whether they only want a one-time reconfiguration. If a one-time customer, payment information is collected at 324.

If a new contract customer, a contract is established at 328. Typically, the contract will include a selection of a service level to be provided (see Option 1, 2, and 3 discussed previously) and a length of the period to provide the service. With the completion of a reconfiguration services contract, a contract database 174 is updated to reflect the information in the newly formed contract. At 334, a reconfiguration kit is prepared for shipment (including, if applicable, remote configuration equipment 142, 144 of FIG. 1, add-on equipment, and a logical implementation of the new configuration) and configuration is performed (such as described with reference to FIG. 2). At 380, the customer and services performed information collected in the previous steps is submitted to a financial center (not shown in FIG. 1) for invoicing the customer.

If the customer is not a first time customer (e.g., is a client), the method 300 continues at 340 with routing the request to a reconfiguration center 110 or solutions center 120, 126 (such as based on geographic location of the customer's data storage center) for response. At 344, the client's information is collected including their existing contract information (e.g., a contract identification number) and the reconfiguration service being requested. At 348, the reconfiguration contracts database 174 is searched for the client's contract and it is determined whether the contract is still valid (e.g., payments are current, request being made within contract period, and the like). If a valid contract is in place, remote reconfiguration is performed as detailed in FIG. 2 and, typically, no billing is required and the method is ended at 390.

If the contract is not valid, the client is prompted at 354 to indicate if they want to handle this reconfiguration as a one-time charge or if they want to establish a new contract. If requested, a new contract is established with the client at 358 (again selecting a level of service) and at 362, the contract database 174 is updated. If a one-time charge is preferred, method of payment information is collected at 370 (and may be necessary for new contracts, too) and reconfiguration is performed remotely. At 380, the collected payment and other information is transmitted to a financial center (not shown) for invoicing the client and the method is ended at 390.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the reconfiguration system 100 is illustrated with only one remote configuration center 110 but the system 100 may include additional centers 110 (such as one for each solutions center 120, 126). Additionally, only one client data storage system 140 is shown for ease of illustration but, of course, the system 100 is useful and intended for monitoring and servicing a much larger number of clients. Similarly, the number of master storage units, hosts, and networks in the client data storage system 140 will vary with each client and the particular client's data storage and sharing requirements and goals.

We claim:

1. A remote reconfiguration computer system, comprising:
a storage management host installed in a client data storage system, wherein the client data storage system includes a data storage subsystem having a first configuration and comprising at least one master storage unit for storing data and providing access to the stored data and one host linked to the master storage unit, and further wherein the storage management host is communicatively linked to and adapted to provide remote access to the master storage unit and the host; and a reconfiguration center communicatively linked to the storage management host, the reconfiguration center being located remote to the client data storage system and configured for receiving a reconfiguration request for the client data storage system from the client data storage system and for, in response to the received reconfiguration request, identifying a predetermined level of reconfiguration services from a plurality of service level options, transferring a logical implementation of a second configuration to the client data storage system via the storage management host, wherein the client data storage system is operable to process the logical implementation to configure the data storage subsystem in the second configuration, wherein the logical implementation is selected or created based on the reconfiguration request, the first configuration, and the identified level of reconfiguration services.

2. The computer system of claim 1, wherein the storage management host is a terminal server configured to provide Ethernet connection to a local area network (LAN) connected to the host and the master storage unit.

3. The computer system of claim 2, wherein the storage management host is further configured to provide serial connection with the master storage unit.

4. The computer system of claim 1, further including a second data storage subsystem having at least one master storage unit and at least one host linked to the master storage unit and wherein the master storage unit of the second data storage subsystem is a different type of data storage device than the master storage unit of the other data storage subsystem.

5. The computer system of claim 1, wherein the transferred logical implementation includes executables that affect a change in the first configuration selected from the group consisting of a logical unit number (LUN) size change, cache blocking, establishing hot standby, changing RAID, logically moving the master storage unit or a portion thereof, mainframe device type changing, adding channels, and increasing performance.

6. The computer system of claim 1, wherein the reconfiguration center includes a modem and the client data storage system includes a dialback modem, wherein the dialback modem is adapted to respond to a connection initiated from the modem by requesting entry of a password, to verify an entered password, to upon verification of the password disconnect the connection and initiate a connection to the modem.

7. A method for remotely reconfiguring a data storage system, comprising:

installing a storage management host within a client data storage system and communicatively linking the storage management host to a remotely-located reconfiguration system and to a master storage unit in the client data storage system;

monitoring the client data storage system;

based on the monitoring, transmitting from the remotely-located reconfiguration system a recommended reconfiguration for the master storage unit to the client data storage system;

at the remotely-located reconfiguration system, receiving a reconfiguration request for the client data storage system from the client data storage system;

in response to the receiving of the reconfiguration request, determining a first configuration of the master storage unit with the remotely-located reconfiguration system;

identifying a level of reconfiguration services from a plurality of service level options for the client data storage system;

transferring from the remotely-located reconfiguration system a logical implementation of a data storage system configuration to the storage management host, the logical implementation being generated based on the reconfiguration request, the first configuration, the identified level of reconfiguration services, and results of the monitoring; and executing the logical implementation to reconfigure the master storage unit from the first configuration to a second configuration.

8. The method of claim 7, wherein the service level options comprises services selected from the group consisting of changing logical unit number (LUN) size, cache blocking, establishing hot standby, changing RAID, logically moving the master storage unit or a portion thereof, changing mainframe device type, adding channels, increasing performance, and providing ongoing configuration monitoring.

9. The method of claim 7, further including remotely verifying and testing the second configuration.

10. A method for remotely reconfiguring a data storage system, comprising:

installing a storage management host within a client data storage system, the client data storage system having a first configuration;

communicatively linking the storage management host to a remotely-located reconfiguration system and to a master storage unit in the client data storage system;

receiving a reconfiguration request for the client data storage system from the client data storage system at the remotely-located reconfiguration system;

determining with the remotely-located reconfiguration system a first configuration of the client data storage system including the master storage unit;

identifying a level of reconfiguration services from a plurality of service level options for the client data storage system;

defining a logical implementation for the client data storage system based on the identified level of reconfiguration services and the first configuration;

transferring from the remotely-located reconfiguration system a logical implementation of a data storage system configuration to the storage management host; and executing the logical implementation to reconfigure the master storage unit from a first to a second configuration.

11. The method of claim 10, wherein the service level options comprise services selected from the group consisting of changing logical unit number (LUN) size, cache blocking, establishing hot standby, changing RAID, logically moving the master storage unit or a portion thereof, changing mainframe device type, adding channels, increasing performance, and providing ongoing configuration monitoring.

12. The method of claim 10, further including remotely verifying and testing the second configuration.

13. The method of claim 10, further including prior to the receiving the reconfiguration request, monitoring the client data storage system and based on the monitoring, issuing a recommended reconfiguration for the client data storage system.

* * * * *